United States Patent
Zimowski et al.

(10) Patent No.: US 6,735,594 B1
(45) Date of Patent: May 11, 2004

(54) TRANSPARENT PARAMETER MARKER SUPPORT FOR A RELATIONAL DATABASE OVER A NETWORK

(75) Inventors: Melvin Richard Zimowski, San Jose, CA (US); Harold Hershey Hall, Jr., San Jose, CA (US); Lynh Nguyen, San Jose, CA (US); Norbert Runge, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 09/602,277

(22) Filed: Jun. 23, 2000

(51) Int. Cl.[7] .............................................. G06F 17/30
(52) U.S. Cl. .............................. 707/102; 707/3; 707/4; 707/10; 707/104; 709/330
(58) Field of Search ................................ 707/1, 2, 3, 4, 707/104, 513, 10, 9, 102; 717/127; 709/330

(56) References Cited

U.S. PATENT DOCUMENTS

| | | | |
|---|---|---|---|
| 5,715,453 A | | 2/1998 | Stewart ....................... 707/513 |
| 5,737,592 A | | 4/1998 | Nguyen et al. ................. 707/4 |
| 5,802,518 A | * | 9/1998 | Karaev et al. .................. 707/9 |
| 5,822,749 A | | 10/1998 | Agarwal ........................ 707/2 |
| 5,897,634 A | * | 4/1999 | Attaluri et al. ................. 707/8 |
| 6,009,271 A | * | 12/1999 | Whatley ....................... 717/127 |
| 6,243,710 B1 | * | 6/2001 | DeMichiel et al. .......... 707/103 |
| 6,321,234 B1 | * | 11/2001 | Debrunner .................. 707/202 |
| 6,473,807 B1 | * | 10/2002 | Hills et al. ................... 709/330 |

OTHER PUBLICATIONS

Boykin, Jr. et al., "Enhance Parameter Marker Usage in SQL Date/Time Arithmetic," IBM Disclosure, Sep. 1991, pp. 1–2.
Sappal, N., "Using a Parameter Marker in the SQL Escape Clause of a Like Predicate," IBM Disclosure, Apr. 1993, pp. 2–3.

* cited by examiner

*Primary Examiner*—Thuy N. Pardo
(74) *Attorney, Agent, or Firm*—Sawyer Law Group LLP

(57) ABSTRACT

A method and system for retrieving data from a database over a network includes: generating an executable statement at a gateway in accordance with a macro language file, where the executable statement comprises one or more a parameter markers; passing the executable statement from the gateway to database software; and passing a value for each parameter marker from the gateway to the database software. The present invention allows the Net.Data gateway to support parameter markers in place of Net.Data variables. This allows the Net.Data gateway to take advantage of the dynamic Structured Query Language (SQL) statement caching feature available with conventional database systems. With the use of this invention, the execution of the SQL statements occurs more rapidly, saving resources and improving performance. Additionally, the Net.Data variables may be automatically replaced with parameter markers, with the Net.Data variables and their values maintained. This provides transparent support for parameter markers.

34 Claims, 3 Drawing Sheets

TRANSPARENT PARAMETER MARKER SUPPORT FOR A RELATIONAL DATABASE OVER A NETWORK

FIELD OF THE INVENTION

The present invention relates to database management systems, and more particularly to accessing a database over the Internet.

BACKGROUND OF THE INVENTION

With the growing popularity of the Internet, so is the demand for access to relational databases via the Internet. FIG. 1 illustrates a conventional network environment 10, which allows access to relational databases 18 over the Internet. One example of this conventional network environment 10 is the Net.Data™ network environment (also known as the "DB2® WWW" network environment), developed by International Business Machines, Corp. The Net-.Data network environment comprises web clients 12, a web server 14, a Net.Data gateway 16, and relational database management system (RDBMS) servers 18, such as those for DB2 databases. DB2 databases are known in the art and will not be described further here. The Net.Data gateway 16 and the RDBMS servers 18 may be located in the same server as the web server 14, or the RDBMS servers they may be located on separate machines. The Net.Data gateway 16 facilitates communication between the web clients 12 and the servers 18 executing RDBMS software. The Net.Data gateway 16 enables an application developer to build web applications for the RDBMS software using Structured Query Language (SQL) and either HyperText Markup Language (HTML) or Extensible Markup Language (XML). The application developer creates SQL statements and HTML pages or XML documents and stores them in Net-.Data applications, called macro language files, at the Net-.Data gateway 16.

An end user of these applications sees only Web pages, such as HTML input forms, on a web browser for his or her requests and the resulting reports. Users fill out the input forms, point and click to navigate the forms, and to access the RDBMS software and relational database. A complete SQL statement is dynamically built by the Net.Data gateway 16 according to the macro language files and/or the user-provided inputs. The SQL statement is sent to the server 18 executing the RDBMS software. The SQL statement is performed by the RDBMS software, and the resulting output is merged into an HTML page or XML document by the Net.Data gateway 16 for presentation to the user.

For example, assume that a macro language file facilitates the retrieval of information concerning various on-line catalog items. A possible SQL statement contained within a Net.Data application is:

SELECT price FROM catalog WHERE itemnum='$(myitem)'. The "$(myitem)" portion of the SQL statement is a Net.Data variable for an item catalog number. The Net-.Data gateway 16 receives a value for this Net.Data variable from the end user via an input HTML form. The Net.Data gateway 16 then constructs the SQL statement with this value for $(myitem) according to the macro language file, and sends it to the RDBMS software for execution.

Using this approach, the Net.Data gateway 16 is required to construct a different SQL statement whenever the end user requests access to a different item. The RDBMS software thus must prepare each SQL statement separately. This hinders the performance of the network 10.

Accordingly, there exists a need for an improved method and system for retrieving data from a relational database over a network. The improved method and system should exploit dynamic SQL statement caching to improve performance. The present invention addresses such a need.

SUMMARY OF THE INVENTION

The present invention provides a method and system for retrieving data from a database over a network. The present invention includes: generating an executable statement at a gateway in accordance with a macro language file, where the executable statement comprises one or more a parameter markers; passing the executable statement from the gateway to database software; and passing a value for each parameter marker from the gateway to the database software. The present invention allows the Net.Data gateway to support parameter markers in place of Net.Data variables. This in turn allows the Net.Data gateway to take advantage of the dynamic Structured Query Language (SQL) statement caching feature available with conventional database systems. With the use of this invention, the execution of the SQL statements occurs more rapidly, saving resources and improving performance. Additionally, the Net.Data variables may be automatically replaced with parameter markers, with the Net.Data variables and their values maintained. This provides transparent support for parameter markers.

DETAILED DESCRIPTION

The present invention provides an improved method and system for retrieving data from a relational database over a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention allows a gateway 16 such as Net.Data to support parameter markers in dynamic SQL statements. This in turn allows the gateway 16 to take advantage of the dynamic SQL statement caching feature available with conventional relational database systems, such as DB2. To more particularly describe the features of the present invention, please refer to FIGS. 2 and 3 in conjunction with the discussion below.

Figure 1:
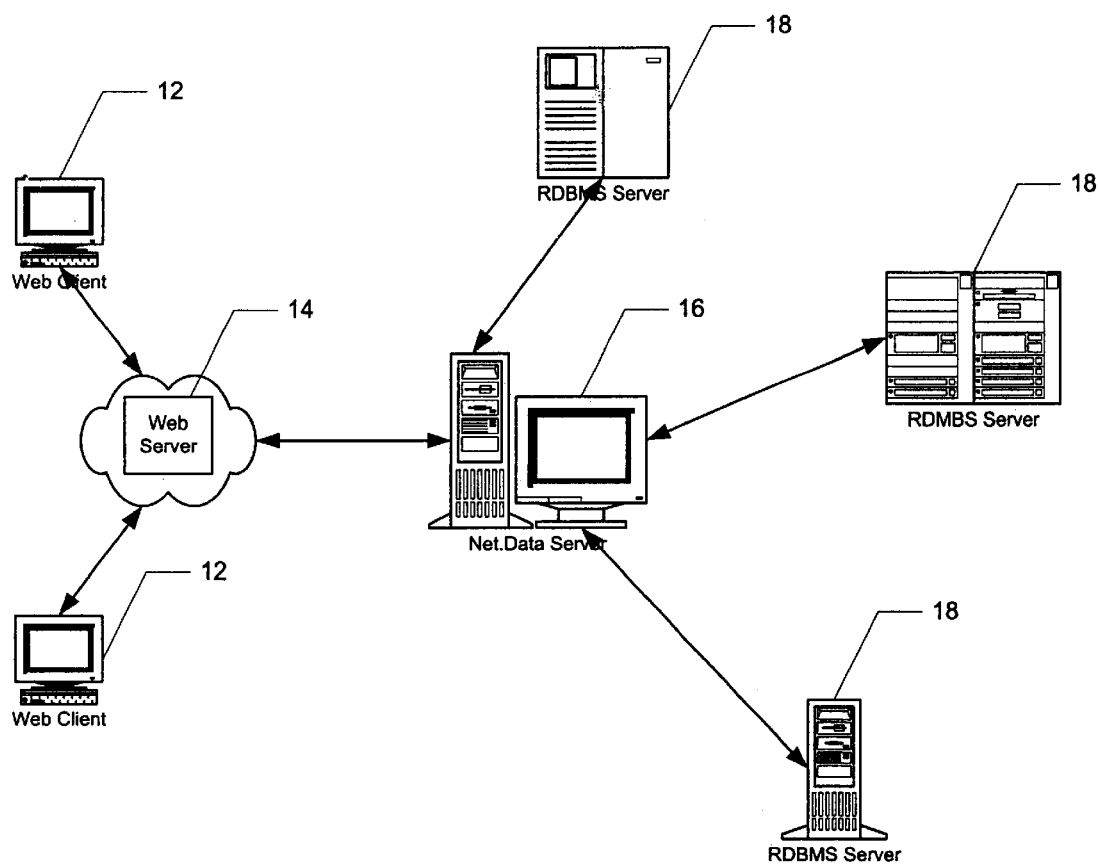
FIG. 1 illustrates a conventional network environment, which allows access to relational databases over the Internet.
Figure 2:
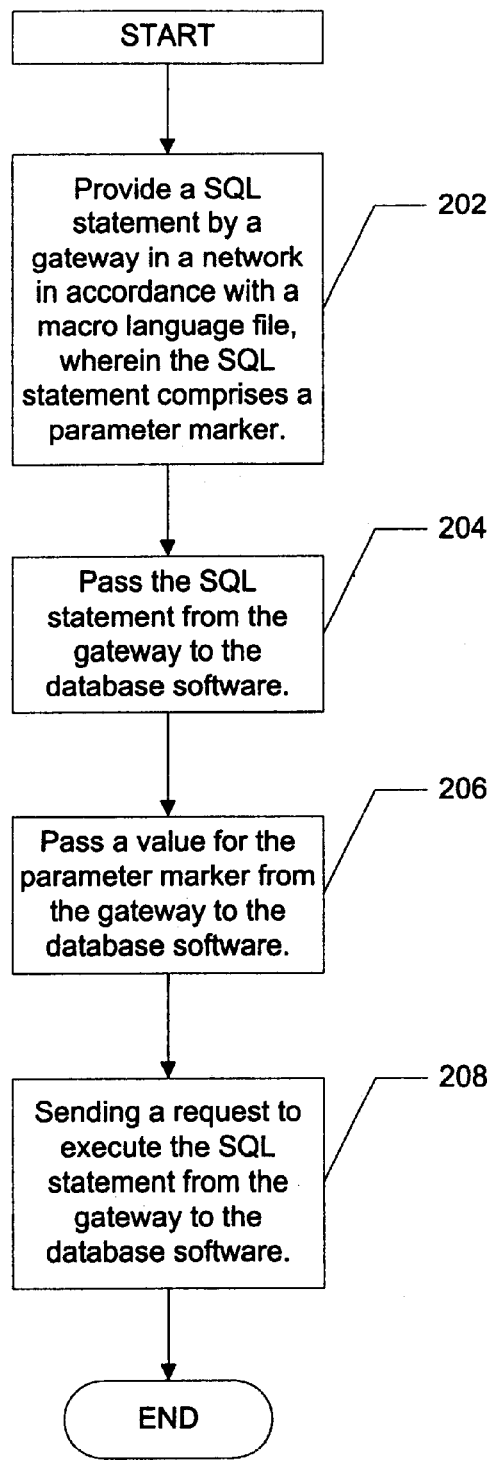
FIG. 2 is a flowchart illustrating a preferred embodiment of a method for parameter marker support in accordance with the present invention.

FIG. 2 is a flowchart illustrating a preferred embodiment of a method for parameter marker support in accordance with the present invention. First, the gateway 16 generates an SQL statement which is executable by the RDBMS software in accordance with a macro language file, via step 202, where the SQL statement contains one or more parameter markers.

A parameter marker is a syntactical element, which may be used in an SQL statement, where the parameter marker can be replaced by a specific values when the SQL statement is executed. For example, a question mark ("?") may be used to indicate a parameter marker. Thus, for the following SQL statement:

SELECT price FROM catalog WHERE itemnum='$(myitem)', a parameter marker could be used in place of the variable, '$(myitem)', resulting in:

SELECT price FROM catalog WHERE itemnum=?. The specific values for the parameter marker may be obtained, for example, from the end user via an HTML input forms.

The advantage of providing parameter marker support in the gateway 16 is the ability to utilize the dynamic statement caching feature of DB2 and other conventional relational database systems. In dynamic statement caching, the RDBMS software first prepares a SQL statement, containing one or more a parameter markers passed to it for execution in a first function call, and caches the prepared SQL statement. The preparation of the SQL statement requires significant resources. When the SQL statement is later executed, the RDBMS software then substitutes the parameter markers with values passed to it in a second function call. Before a subsequent pass of the same SQL statement is prepared a second time, the RDBMS software first checks the dynamic statement cache for the SQL statement. When found, the cached SQL statement is reused without the need for the RDBMS software to reprepare the statement. Thus, the cost of preparing the SQL statement is avoided and execution of the SQL statement occurs more rapidly, improving performance. In this manner, application developers may create macro language files that allow the gateway 16 to take advantage of the dynamic statement caching feature of the RDBMS software.

Returning to FIG. 2, the SQL statement with one or more parameter markers is then passed from the gateway 16 to the RDBMS software, via step 204. Next, a value for each parameter marker is passed from the gateway 16 to the RDBMS software, via step 206. The gateway 16 then sends a request to the RDBMS software to execute the SQL statement, via step 208. In executing the SQL statement, the RDBMS software substitutes the values passed to it by the gateway 16 for the parameter markers. The result is returned to the gateway 16 and may be displayed to the end user. In the preferred embodiment, the SQL statement with the parameter markers is passed in a first function call, while the values for the parameter markers is passed in a second function call.

For existing Net.Data macro language files, the method and system in accordance with the present invention provides an additional feature of automatically replacing existing gateway variables with parameter markers. This avoids the need for manual modification of the gateway macro language files. Thus, this conversion is transparent to the application developers. In replacing gateway variables with parameter markers, this additional feature also maintains the gateway variables and their values. The values are passed to the RDBMS software in the second function call in accordance with step 206 of FIG. 2. The gateway variables may later be used to merge the output from the RDBMS software into HTML pages or XML documents for presentation to the end user.

However, the gateway 16 may be less restrictive than the RDBMS software about where a variable can exist in a SQL statement. To avoid replacing a gateway variable with a parameter marker when the replacement would not be recognized by the RDBMS software, a status variable is used. The status variable indicates whether or not the gateway should replace gateway variables with parameter markers. For example, if the status variable is set to "yes", then the replacement does occur. If the status variable is set to "no", then the replacement does not occur. This status variable may be defined and set within a macro language file, such that if a macro language file has multiple SQL statements, the gateway may replace gateway variables with parameters markers in some SQL statements but not in others. The status variable can also be set in a configuration file so that it applies to all macros.

Figure 3:
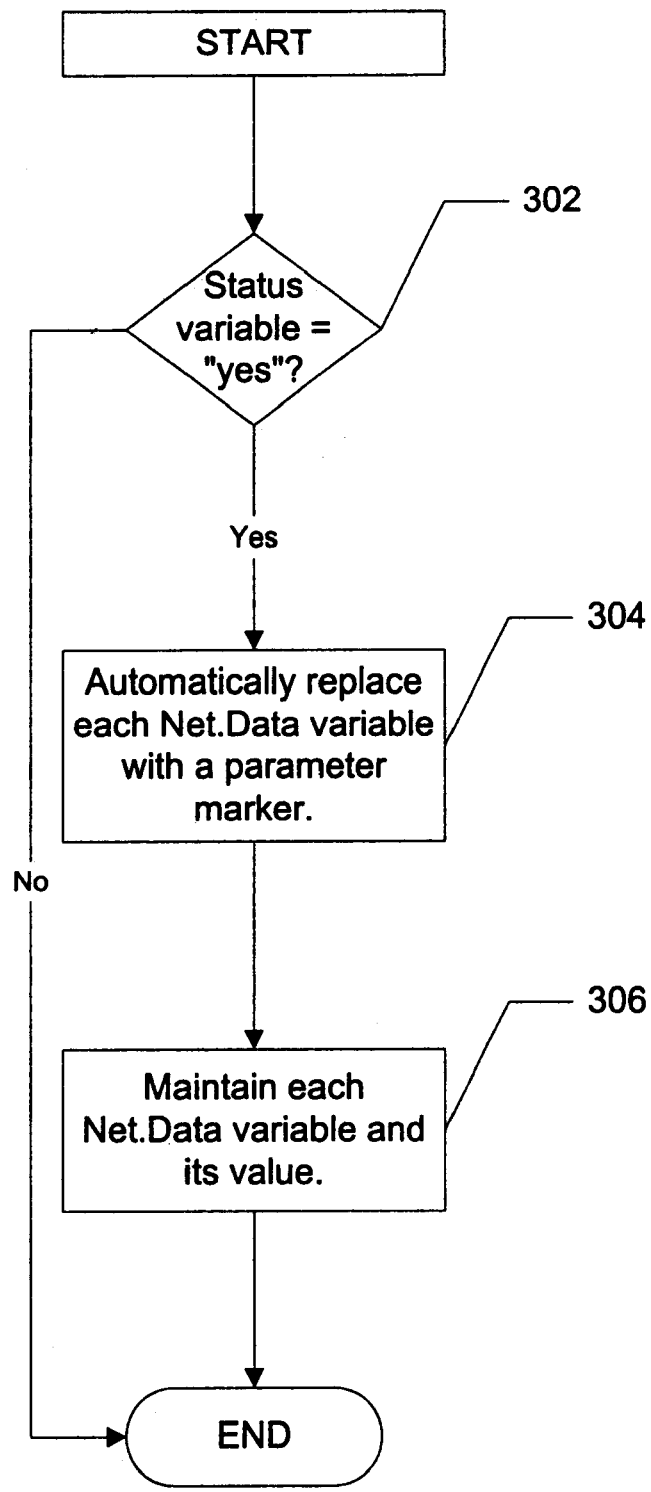
FIG. 3 is a flowchart illustrating a preferred embodiment of the automatic replacement feature in accordance with the present invention.

FIG. 3 is a flowchart illustrating a preferred embodiment of the automatic replacement feature in accordance with the present invention. The value of the status variable for a SQL statement is first checked, via step 302. If the value is "yes", then each gateway variable in the SQL statement is automatically replaced with a parameter marker, via step 304. Also, each gateway variable and its value are maintained by the gateway 16, via step 306. Steps 302 through 306 are repeated for each SQL statement in the macro language file. The macro language file may then be utilized in accordance with the steps illustrated in FIG. 2.

Although the present invention is described in the context of a Net.Data gateway and DB2, one of ordinary skill in the art will understand that other applications and relational databases may be used without departing from the spirit and scope of the present invention.

An improved method and system for retrieving data from a relational database over a network has been disclosed. The present invention allows the Net.Data gateway to support parameter markers in place of Net.Data variables. This in turn allows the Net.Data gateway to take advantage of the dynamic SQL statement caching feature available with conventional database systems, such as DB2. With the use of this invention, the execution of the SQL statements occurs more rapidly, saving resources and improving performance. Additionally, the Net.Data variables may be automatically replaced with parameter markers, with the Net.Data variable and their values maintained. This provides transparent support for parameter markers.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for retrieving data from a database over a network, comprising the steps of:

(a) generating an executable statement at a gateway in accordance with a macro language file, wherein the executable statement comprises one or more parameter markers;

(b) passing the executable statement comprising the parameter markers from the gateway to database software, wherein one or more variables can be found to each parameter marker;

(c) passing a value for each parameter marker from the gateway to the database software; and (d) sending a request from the gateway to the database software to execute the executable statement, wherein each parameter marker is substituted for its value when the executable statement is executed.

2. The method of claim 1, wherein the executable statement comprises a Structured Query Language (SQL) statement.

3. The method of claim 1, wherein the gateway comprises a Net.Data gateway.

4. The method of claim 1, wherein the parameter marker is a syntactical element, wherein one or more variables can be found to the parameter marker, wherein each parameter marker is replaced by a value when the executable statement is executed.

5. The method of claim 1, wherein the passing step (b) occurs in a first function call by the gateway to the database software.

6. The method of claim 1, wherein the passing step (c) occurs in a second function call by the gateway to the database software.

7. The method of claim 1, wherein the database software comprises a relational database management system (RDBMS) software.

8. The method of claim 1, wherein prior to the providing step (a), comprises:
(a1) determining if a status variable for a statement in the macro language file indicates that variable replacement should occur;
(a2) automatically replacing each variable in the statement with a parameter marker if the status variable indicates that variable replacement should occur; and
(a3) maintaining each variable and a value for each variable.

9. The method of claim 8, wherein each variable comprises a Net.Data variable.

10. A system, comprising:
a gateway capable of being coupled to a database server, having database software further comprising a first process for generating an executable statement in accordance with a macro language file wherein the executable statement comprises one or more parameter markers, a second process for passing the executable statement comprising the parameter markers to the database software, wherein one or more variables can be found to each parameter marker and a third process for passing a value for each parameter marker to the database software, wherein each parameter marker is substituted for its value when the executable statement is executed.

11. The system of claim 10, wherein the database server comprises a RDBMS server.

12. The system of claim 10, wherein the database software comprises RDBMS software.

13. The system of claim 10, wherein the gateway comprises a Net.Data gateway.

14. The system of claim 10, wherein the executable statement comprises a SQL statement.

15. The system of claim 10, wherein the parameter marker is a syntactical element, wherein one or more variables can be found to the parameter marker, wherein each parameter marker can be replaced by a value when the executable statement is executed.

16. The system of claim 10, wherein the SQL statement is passed to the database software in a first function call.

17. The system of claim 10, wherein the values are passed to the database software in a second function call.

18. The system of claim 10, wherein the gateway is capable of being coupled to a web server coupled to a plurality of web clients.

19. A method for retrieving data from a database over a network, comprising the steps of:

(a) determining if a status variable for a statement in a macro language file in a gateway indicates that variable replacement should occur;
(b) automatically replacing each variable in the statement with a parameter marker if the status variable indicates that variable replacement should occur;
(c) maintaining each variable and a value for each variable;
(d) generating an executable statement comprising the parameter marker for each variable at the gateway in accordance with the statement in the macro language file;
(e) passing the executable statement comprising the parameter marker for each variable to database software wherein one or more variables can he found to the parameter marker;
(f) passing a value for each parameter marker to the database software; and
(g) sending a request from the gateway to the database software to execute the executable statement, wherein each parameter marker is substituted for its value when the executable statement is executed.

20. The method of claim 19, wherein the executable statement comprises a SQL statement.

21. The method of claim 19, wherein the gateway comprises a Net.Data gateway.

22. The method of claim 19, wherein the parameter marker is a syntactical element, wherein one or more variables can be found to the parameter marker, wherein each parameter marker is replaced by a value when the executable statement is executed.

23. The method of claim 19, the database software comprises RDBMS software.

24. A computer readable medium with program instructions for retrieving data from a database over a network, the instructions for:
(a) generating an executable statement at a gateway in accordance with a macro language file, wherein the executable statement comprises one or more parameter markers;
(b) passing the executable statement comprising the parameter markers from the gateway to database software, wherein one or more variables can be found to each parameter marker;
(c) passing a value for each parameter marker from the gateway to the database software; and
(d) sending a request from the gateway to the database software to execute the executable statement, wherein each parameter marker is substituted for its value by the database software when the executable statement is executed.

25. A computer readable medium with program instructions for retrieving data from a database over a network, the instructions for:
(a) determining if a status variable for a statement in a macro language file in a gateway indicates that variable replacement should occur;
(b) automatically replacing each variable in the statement with a parameter marker if the status variable indicates that variable replacement should occur;
(c) maintaining each variable and a value for each variable;
(d) generating an executable statement comprising the parameter marker for each variable at the gateway in accordance with the macro language file;

(e) passing the executable statement comprising the parameter marker for each variable to a database software, wherein one or more variables can be found to the parameter marker;

(f) passing a value for each parameter marker to the database software; and (g) sending a request from the gateway to the database software to execute the executable statement, wherein each parameter marker is substituted for its value by the database software when the executable statement is executed.

26. A system, comprising:

means for generating an executable statement at a gateway in a network in accordance with a macro language file, wherein the executable statement comprises one or more parameter markers;

means for passing the executable statement comprising the parameter markers to database software, wherein one or more variables can be found to each parameter marker;

means for passing a value for each parameter marker to the database software; and means for sending a request from the gateway to the database software to execute the executable statement, wherein each parameter marker is substituted for its value by the database software when the executable statement is executed.

27. A system, comprising:

means for determining if a status variable for a statement in a macro language file in a gateway indicates that variable replacement should occur;

means for automatically replacing each variable in the statement with a parameter marker if the status variable indicates that variable replacement should occur;

means for maintaining each variable and a value for each variable;

means for generating an executable statement comprising the parameter marker for each variable at the gateway in accordance with the macro language file;

means for passing the executable statement comprising the parameter marker for each variable to a database software, wherein one or more variables can be found to the parameter marker;

means for passing a value for each parameter marker to the database software; and means for sending a request from the gateway to the database software to execute the executable statement, wherein each parameter marker is substituted for its value by the database software when the executable statement is executed.

28. A method for retrieving data from a database over a network, comprising the steps of:

(a) generating a dynamic Structured Query Language (SQL) statement at a gateway in accordance with a macro language file, wherein the dynamic SQL statement comprises one or more parameter markers;

(b) passing the dynamic SQL statement comprising the parameter markers from the gateway to database software;

(c) passing a value for a variable bound to each parameter marker in the dynamic SQL statement from the gateway to the database software; and (d) sending a request from the gateway to the database software to execute the dynamic SQL statement, wherein each parameter marker is substituted for its value when the dynamic SQL statement is executed.

29. A system, comprising:

a gateway capable of being coupled to a database server, having database software further comprising a first process for generating a dynamic Structure Query Language (SQL) statement in accordance with a macro language file wherein the dynamic SQL statement comprises one or more parameter markers, a second process for passing the dynamic SQL statement comprising the parameter markers to the database software, and a third process for passing a value for a variable bound to each parameter marker in the dynamic SQL statement to the database software, wherein each parameter marker is substituted for its value when the dynamic SQL statement is executed.

30. A method for retrieving data from a database over a network, comprising the steps of:

(a) determining if a status variable for a statement in a macro language file in a gateway indicates that variable replacement should occur;

(b) automatically replacing each variable in the statement with a parameter marker if the status variable indicates that variable replacement should occur;

(c) maintaining each variable and a value for each variable;

(d) generating a dynamic Structure Query Language (SQL) statement comprising the parameter marker for each variable at the gateway in accordance with the statement in the macro language file;

(e) passing the dynamic SQL statement comprising the parameter marker for each variable to database software;

(f) passing a value for each variable for each parameter marker to the database software; and (g) sending a request from the gateway to the database software to execute the dynamic SQL statement, wherein each parameter marker is substituted for its value when the dynamic SQL statement is executed.

31. A computer readable medium with program instructions for retrieving data from a database over a network, the instructions for:

(a) generating a dynamic Structure Query Language (SQL) statement at a gateway in accordance with a macro language file, wherein the dynamic SQL statement comprises one or more parameter markers;

(b) passing the dynamic SQL statement comprising the parameter markers from the gateway to database software;

(c) passing a value for a variable for each parameter marker from the gateway to the database software; and (d) sending a request from the gateway to the database software to execute the dynamic SQL statement, wherein each parameter marker is substituted for its value by the database software when the dynamic SQL statement is executed.

32. A computer readable medium with program instructions for retrieving data from a database over a network, comprising the instructions for:

(a) determining if a status variable for a statement in a macro language file in a gateway indicates that variable replacement should occur;

(b) automatically replacing each variable in the statement with a parameter marker if the status variable indicates that variable replacement should occur;

(c) maintaining each variable and a value for each variable;

(d) generating a dynamic Structure Query Language (SQL) statement comprising the parameter marker for each variable at the gateway in accordance with the statement in the macro language file;

(e) passing the dynamic SQL statement comprising the parameter marker for each variable to database software;

(f) passing a value for each variable for each parameter marker to the database software; and (g) sending a request from the gateway to the database software to execute the dynamic SQL statement, wherein each parameter marker is substituted for its value when the dynamic SQL statement is executed.

33. A system, comprising:

means for generating a dynamic Structured Query Language (SQL) at a gateway in a network in accordance with a macro language file, wherein the dynamic SQL statement comprises one or more parameter markers;

means for passing the dynamic SQL statement comprising the parameter markers to database software;

means for passing a value for a variable for each parameter marker to the database software; and means for sending a request from the gateway to the database software to execute the dynamic SQL statement, wherein each parameter marker is substituted for its value by the database software when the dynamic SQL statement is executed.

34. A system, comprising:

means for determining if a status variable for a statement in a macro language file in a gateway indicates that variable replacement should occur;

means for automatically replacing each variable in the statement with a parameter marker if the status variable indicates that variable replacement should occur;

means for maintaining each variable and a value for each variable;

means for generating a dynamic Structure Query Language (SQL) statement comprising the parameter marker for each variable at the gateway in accordance with the macro language file;

means for passing the dynamic SQL statement comprising the parameter marker for each variable to a database software;

means for passing a value for a variable for each parameter marker to the database software; and means for sending a request from the gateway to the database software to execute the dynamic SQL statement, wherein each parameter marker is substituted for its value by the database software when the dynamic SQL statement is executed.

* * * * *

UNITED STATES PATENT AND TRADEMARK OFFICE
CERTIFICATE OF CORRECTION

PATENT NO.     : 6,735,594 B1
DATED          : May 11, 2004
INVENTOR(S)    : Melvin R. Zimowski et al.

It is certified that error appears in the above-identified patent and that said Letters Patent is hereby corrected as shown below:

Column 5,
Lines 8 and 56, delete "found" and replace with -- bound --.

Column 6,
Line 30, delete "found" and replace with -- bound --.

Column 7,
Lines 3, 19 and 44, delete "found" and replace with -- bound --.

Signed and Sealed this

Fifth Day of October, 2004

JON W. DUDAS
*Director of the United States Patent and Trademark Office*